United States Patent [19]

Sammarco

[11] Patent Number: 5,551,073
[45] Date of Patent: Aug. 27, 1996

[54] AUTHENTICATION KEY ENTRY IN CELLULAR RADIO SYSTEM

[75] Inventor: Anthony J. Sammarco, Garner, N.C.

[73] Assignee: Ericsson Inc., Research Triangle Park, N.C.

[21] Appl. No.: 23,345

[22] Filed: Feb. 25, 1993

[51] Int. Cl.$^6$ ..................................... H04B 1/38
[52] U.S. Cl. .................... 455/89; 455/54.1; 379/58; 379/62; 380/23; 340/825.34
[58] Field of Search .................... 380/23, 25, 21; 455/54.1, 89, 56.1, 33.1; 379/58, 62, 63, 59; 340/825.31, 825.34, 825.22

[56] References Cited

U.S. PATENT DOCUMENTS

| | | | |
|---|---|---|---|
| 4,885,762 | 12/1989 | Suzuki et al. | 379/58 |
| 4,897,875 | 1/1990 | Pollard et al. | 380/21 |
| 4,924,480 | 5/1990 | Gay et al. | 375/8 |
| 4,937,855 | 6/1990 | McNab et al. | 379/103 |
| 4,945,556 | 6/1990 | Namekawa | 379/58 |
| 5,091,942 | 2/1993 | Dent | 455/33.1 |
| 5,239,294 | 8/1993 | Flanders et al. | 379/62 |

OTHER PUBLICATIONS

Miyamoto et al Radio Terminal System, Jul. 1978.
IS–54–A: Dual–Mode Mobile Station–Base Station Compatibility Standard (Jan. 1991; Version Mar. 1, 1991).
IS–54–B: Cellular System Dual–Mode Mobile Station–Base Station Compatibility Standard (Apr., 1992).
Ericsson GE Mobile Communications Inc., Contribution to TIA Digital Cellular Subcommittee TR45.3, Working Group TR45.3.2, "Concerns Found With Appendix A," Feb. 7, 1992.
McCaw Cellular Communications, Inc., Contribution to TIA Digital Cellular Subcommittee TR45. 3, Working Group TR45.3.2.6, "User Interface for the Authentication Key in IS–54 Rev. B Mobiles," Apr. 28, 1992.
TIA TR45 Product Notification (PN), "User Interface for Authentication Key Entry," PN–3043, Revision 0, Jul. 17, 1992.
TIA TR45 Technical Service Bulletin (TSB), "User Interface for Authentication Key Entry," TSB–50, Dec. 18, 1992.

Primary Examiner—Reinhard J. Eisenzopf
Assistant Examiner—Lee Nguyen
Attorney, Agent, or Firm—Robert A. Samra

[57] ABSTRACT

A mobile station is disclosed which may be operated in both a set-up programming mode and in an authentication key programming mode. The authentication key programming mode may be invoked through a series of keystrokes on a keypad in the mobile station. The mobile station allows the entry of a separate authentication key for each mobile station identification number stored in memory. The mobile station also checks the accuracy of the entered authentication key and alerts the user as to whether the entered authentication key is valid or invalid.

15 Claims, 2 Drawing Sheets

AUTHENTICATION KEY ENTRY IN CELLULAR RADIO SYSTEM

BACKGROUND OF THE INVENTION

1. Field of the Invention

The present invention relates to wireless communication systems, and more particularly, to a method and apparatus for entering an authentication key which is used to authenticate mobile stations in a cellular radio system.

2. History of the Prior Art

Cellular mobile telephony is one of the fastest growing segments in the worldwide telecommunications market. Between 1984 and 1992, for example, the number of mobile telephone subscribers in the United States grew from around 25,000 to over 10 million. It is estimated that the number of subscribers will rise to nearly 22 million by year end 1995 and to 90 million by the year 2000.

Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is billed based on the amount of "airtime" he or she spends talking on the cellular telephone each month. Many of the service features available to landline telephone users, e.g., call waiting, call forwarding, three-way calling, etc., are also generally available to mobile subscribers.

In the United States, cellular licenses are awarded by the Federal Communications Commission (FCC) pursuant to a licensing scheme which divides the country into geographic service markets defined according to the 1980 Census. Only two cellular licenses are awarded for each market. The two cellular systems in each market are commonly referred to as the "A" system and "B" system, respectively. Each of the two systems is allocated a different frequency block in the 800 MHz band (called the A-band and B-band, respectively). To date, the FCC has released a total of 50 Mhz for cellular services (25 MHz per system).

Mobile subscribers have the freedom to subscribe to service from either the A-system or the B-system operator (or both). The local system from which service is subscribed is called the "home" system. When travelling ("roaming") outside the home system, a mobile subscriber may be able to obtain service in a distant system if there is a roaming agreement between the operators of the home and "visited" systems.

The Cellular System

In a typical cellular radio system, a geographical area, e.g., a metropolitan area, is divided into several radio coverage areas (called cells). The cells are served by a series of fixed radio stations (called base stations). The base stations are connected to and controlled by a mobile services switching center (MSC). The MSC, in turn, is connected to the landline (wireline) public switched telephone network (PSTN). The telephone users (mobile subscribers) in the cellular radio system are provided with portable (hand-held), transportable (hand-carried) or mobile (car-mounted) telephone units (mobile stations) which communicate with the MSC through a nearby base station. The MSC switches calls between wireline and mobile subscribers, controls signalling to the mobile stations, compiles billing statistics, and provides for the operation, maintenance and testing of the system.

Each of the cells in a cellular radio system is allocated a subset of the radio frequency (RF) channels assigned to the entire cellular system (25 MHz). Each RF channel consists of a pair of separate frequencies, one for transmission by the base station (reception by the mobile station) and one for transmission by the mobile station (reception by the base station). One of the RF channels in each cell (called the control channel) is used to carry control data (supervisory data messages) between the base station and the mobile stations in the cell. The other RF channels are used to carry voice conversations. The RF (control and voice) channels used in any given cell may be reused in a distant cell in accordance with a predetermined frequency reuse pattern. The base station in each cell includes a number of transceivers, each of which operates on only one of the different RF channels used in the cell. The transceiver in each mobile station, on the other hand, may tune to any of the RF channels specified in the system.

During the idle state (turned on but not in use), a mobile station in a cell tunes to and monitors the control channel. When a wireline subscriber calls a mobile subscriber, the call is directed from the PSTN to the MSC which requests the base stations to "page" the mobile station over each of their control channels. If the MSC receives a response from the mobile station (which occurs automatically if the mobile station is turned on), the MSC assigns the mobile station an available voice channel at the closest base station, turns the selected voice channel transceiver on, and orders the mobile station to tune to the selected voice channel where a voice connection is then established. If the mobile station moves between cells while in the conversation state, the MSC will order a "handoff" of the call to an available voice channel at the new base station. A similar procedure is used for mobile originations.

A mobile station gains access to a cellular system by qualifying for service in the cellular system. For this purpose, each mobile station is identified by a mobile identification number (MIN) and an electronic serial number (ESN). The MIN is a 34-bit binary number which is derived from the directory telephone number of the mobile subscriber, and which is usually programmed into the mobile station at the time of service installation. The ESN is a 32-bit binary number which is unique to each mobile station, and which is set at the factory, not to be altered in the field. At every system access, e.g., call origination, the MIN/ESN pair is sent over the control channel from the mobile station (through a nearby base station) to the MSC (for incoming calls, the MIN is included in the page message sent over the control channel to the mobile station). The MSC will determine whether the received MIN/ESN pair belongs to a "home" subscriber or to an authorized "roamer" from another system (the MSC may also compare the received ESN to a "blacklist" of mobile stations which have been reported to be stolen). If the MIN/ESN pair is not recognized or if the ESN is blacklisted, the mobile station will be denied access.

The Migration from Analog to Digital

Until recently, the radio transmission format in cellular systems has been analog frequency modulation (FM). With FM, a sinusoidal carrier wave at the transmit or receive frequency of the RF channel is modulated (varied) in proportion to the instantaneous amplitude of the analog voice signal. The modulated carrier occupies a region of the spectrum about the carrier frequency. This region is called the channel bandwidth and is usually 30 KHz wide. Each analog voice conversation, therefore, requires a full RF channel (60 KHz).

Recent developments, however, have ushered a new digital era for cellular communications. The main driving force behind the switch to digital has been the desire to increase spectrum efficiency to meet the ever-increasing demands on system capacity. As each cellular system is allocated a finite amount of radio spectrum, capacity may be increased by reducing the amount of bandwidth required for each voice channel or, conversely, by sharing each RF channel among several voice conversations. This is made possible with the use of digital technology. By encoding (digitizing and compressing) and multiplexing speech from several voice circuits prior to modulation and transmission, a single RF channel may be shared by several digital speech channels, instead of carrying only one analog speech channel (one voice conversation).

In the United States, the migration from analog to digital has been spearheaded by the Electronics Industries Association (EIA) and the Telecommunication Industry Association (TIA) which have adopted an interim standard for the air interface in the new digital cellular systems. This EIA/TIA interim standard is known as the "Cellular System Dual-Mode Mobile Station-Base Station Compatibility Standard," or simply the "IS-54" standard (Rev. B of IS-54 is currently in effect: copies of this and any other revisions of IS-54 may be obtained from the Electronics Industries Association; 2001 Pennsylvania Avenue, N.W.; Washington, D.C. 20006). The term "dual-mode" refers to the capability of the system to operate in either an analog or digital mode. The analog mode of operation uses conventional analog FM. The digital mode of operation uses time division multiple access (TDMA) in which the RF channel is divided into a series of repeating time slots each containing a burst of encoded speech from a different source (e.g., a different voice circuit).

According to IS-54, each digital TDM RF channel can carry from three to six digital speech channels (three to six telephone conversations) depending on the source rate of the speech coder used for each digital speech channel. At call set-up, the dual-mode mobile stations may be assigned either an analog voice channel (an entire carrier frequency) or a digital traffic channel (a repeating time slot on a carrier frequency). The analog-only mobile stations, however, can only be assigned an analog voice channel.

Cellular Fraud

In addition to providing for a new, digital radio transmission format, IS-54 specifies a procedure for confirming the identity of mobile stations demanding service in a cellular system. A serious problem which has plagued the cellular industry for some time has been the widespread, fraudulent use of MIN/ESN pairs to steal cellular service. Many of the mobile stations in use today can be programmed to transmit any MIN/ESN pair so as to "trick" the system into granting access. Further background on this MIN/ESN "tumbling" and the resultant revenue and service losses can be found in the article entitled "Cellular Fraud" by Henry M. Kowalczyk, in *Cellular Business*, dated March 1991, at pp. 32–35.

Fraud in the form of MIN/ESN tumbling arose primarily in a "manual roaming" environment where the cellular systems were not interconnected on a real-time basis. Each MSC usually contains a list only of valid MIN/ESN pairs belonging to the home subscribers, and does not have immediate access to counterpart lists in other systems. Hence, by using a roamer MIN (a 10-digit directory telephone number containing an area code other than the local area code), a fraudulent mobile station could receive service from the local cellular system until an indication of the invalidity of the MIN/ESN pair has been received (hours later) from the home system of the pretending roamer (or from a clearing house). In an "automatic roaming" environment, however, the cellular systems are networked together on a real-time basis in accordance with the provisions of EIA/TIA Interim Standard IS-41 (or through a proprietary signalling protocol). Consequently, the serving cellular system can obtain verification of a MIN/ESN pair from a home system virtually immediately and can, therefore, deny service to a MIN/ESN tumbler without significant delay.

The real threat to automatic roaming is a new and elusive type of fraud known as "cloning" in which a fraudulent user adopts the bona fide MIN/ESN pair of a valid (paying) subscriber. The fraudulent user may surreptitiously acquire a bona fide MIN/ESN pair, or even a list of valid MIN/ESN pairs, in several ways. For example, in some instances, bona fide MIN/ESN numbers are printed on, and may be read from, a label which is affixed to a mobile station belonging to a valid subscriber. In other instances, a list of bona fide MIN/ESN pairs may be purchased on the "black market" or directly from an employee of the cellular operator. In addition, since each mobile station transmits the MIN/ESN pair to the serving exchange at every system access, one or more bona fide MIN/ESN pairs may be intercepted by listening to radio transmissions on the control channel.

Authentication

The new IS-54 standard offers a long-term solution to the problem of cellular fraud, including cloning, through a process called "authentication." The purpose of authentication is to enable a base station to confirm the identity of a mobile station through an exchange of information between the base station and the mobile station. For authentication to succeed, the base station and the mobile station must have identical sets of shared secret data (SSD). The SSD is stored in the MSC of the home system, or in a separate subscriber database called a "home location register" (HLR) connected to this MSC, and made available to the base station. Each mobile station also stores the SSD in memory.

In the process of authentication, the base station generates and sends to the mobile station a random bit pattern, called RAND or RANDU, on the control channel, analog voice channel (AVC) or digital traffic channel (DTC). Each of the mobile station and the base station uses RAND, a portion of SSD called SSD-A (the remaining portion, SSD-B, is used for encryption, and not for authentication), along with other input parameters, e.g., the MIN and ESN of the mobile station, in a Cellular Authentication and Voice Encryption (CAVE) algorithm, which is defined in Appendix A to IS-54, to generate an authentication response called AUTHR or AUTHU (depending on whether RAND or RANDU is used, respectively). The authentication response computed in the mobile station is sent to the base station to be compared with the authentication response computed in the base station. If the authentication responses match, authentication is considered successful, i.e., the base station and the mobile station are considered to have identical sets of SSD. However, if the comparison at the base station fails, the base station may deny service to the mobile station or commence the process of updating the SSD.

The procedure for updating SSD for any mobile station involves the application of CAVE initialized with mobile station-specific information (ESN), certain random data (RANDSSD), and a secret, permanent authentication key, called the "A-key," which is uniquely assigned to the mobile station. For security reasons, the A-key is never transmitted over the air interface between the base station and the mobile station, or over the network interface between different cellular systems. The A-key is stored in the MSC or the HLR and must be entered into the memory of the mobile station for use in updating the SSD. The default value of the A-key when the mobile station is shipped from the factory will be all binary zeros. The operational value of the A-key is assigned by the system operator when a mobile subscriber signs up for service. The assigned A-key value will be delivered to the subscriber in person, through the postal services (e.g., registered mail), or in some other convenient method determined by the operator.

At present, entry of the A-key into the mobile station is slated to be handled by authorized technicians at the time of mobile service activation. The A-key is to be programmed using a special facility provided in every mobile station sold, called the number administration module (NAM) programming mode, which allows the setup and configuration of the mobile station through the entry of system-specific parameters (e.g., control channel number and system identification number (SID)), and subscriber-specific parameters (e.g., the user MIN and lock code) at the time of installation or service. NAM programming requires a qualified technician with access to the installation and service directions specified by the mobile station manufacturer.

Relying only on NAM programming for A-key entry limits A-key programming access. By its very nature, NAM programming is far beyond the skills and capabilities of the average individual (or mobile subscriber) and is normally left to the professionals. Even where an individual has some knowledge of NAM programming, it is not desirable for the individual to invoke the NAM programming mode in the mobile station merely to enter the A-key value, because of the risk of inadvertent tampering with the values of all the other critical parameters which are stored in the mobile station and which are accessible during NAM programming.

It is, therefore, an object of the present invention to provide a means to enter the A-key which is separate from NAM programming, which is relatively easy to use (user-friendly), and which requires no special technical knowledge to use.

It is another object of the present invention to notify the user of whether the A-key entered is valid or invalid, and to allow the user to edit his entry.

It is yet another object of the present invention to allow the use of multiple A-keys for multiple MINs stored in the mobile station.

SUMMARY OF THE INVENTION

In one aspect, the present invention provides a mobile station which may be operated in both a set-up programming mode and in an authentication key programming mode. The authentication key programming mode may be invoked through a series of keystrokes on a keypad in the mobile station.

In another aspect, a mobile station constructed in accordance with the present invention includes means for entering secret data into the mobile station, means for validating the entered secret data, and means for generating an external indication of the validity of the entered secret data. The external indication may be a text string which is shown on a display in the mobile station.

In yet another aspect, the present invention provides a method for entering authentication information into a mobile station which is assigned at least one mobile identification number (MIN) stored in the mobile station. The method includes the steps of assigning a separate authentication key (A-key) for each MIN, displaying in the mobile station an indication of any stored MIN in response to a user-entered command, receiving in the mobile station a value of the A-key to be associated with the indicated MIN, validating the received value of the A-key through an authentication algorithm executed in the mobile station, and storing in the mobile station the received A-key value in association with the indicated MIN if the A-key value is determined to be valid.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
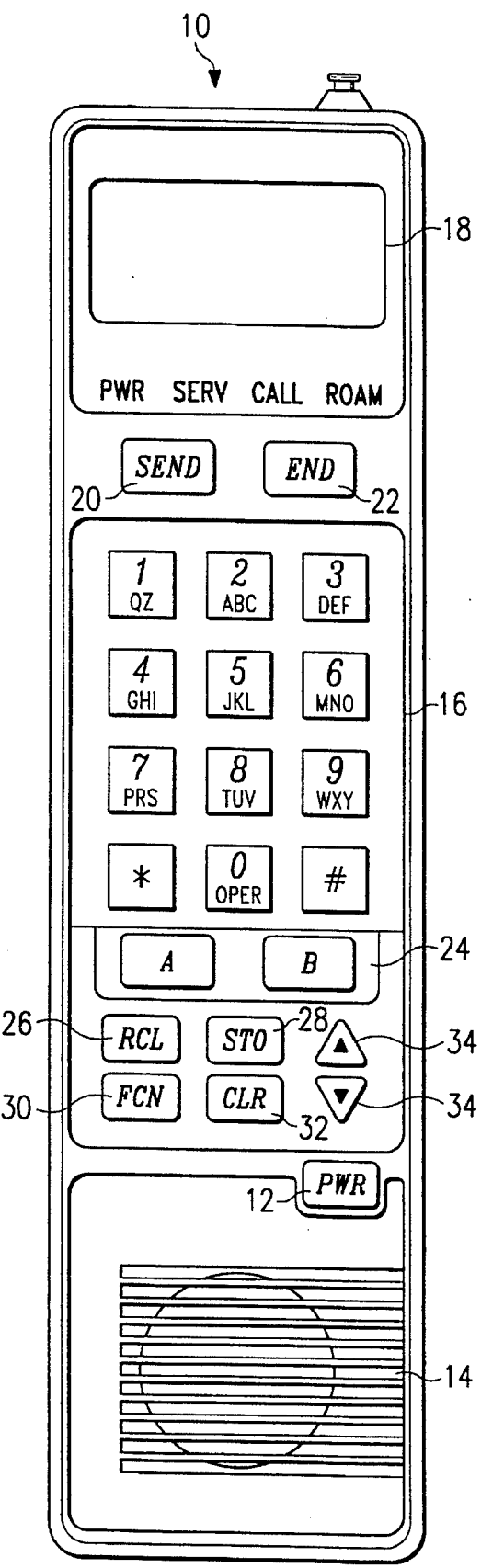
FIG. 1 is a pictorial representation of an exemplary handset for a mobile station constructed in accordance with the present invention.

Referring first to FIG. 1, a pictorial illustration of an exemplary mobile station handset may now be seen. The handset 10 includes a power (on/off) button 12, a speaker 14 (the microphone is on the other side of the handset 10 and is not shown), an alphanumeric keypad 16, a display (including a display window) 18, and a number of control or function keys: a "SEND" key 20, an "END" key 22, repeat dial buttons ("A" and "B") 24, a recall ("RCL") key 26, a store ("STO") key 28, a function ("FCN") key 30, a clear ("CLR") key 32, and "up" and "down" keys 34.

With continuing reference to FIG. 1, the SEND button 20 is pushed after all the dialed digits have been entered with the keypad 16 when making a call. The END key 22 is used to end a conversation ("hang-up" the phone), or to exit from any available programming mode. The repeat dial keys 24 are used for rapid, one-touch dialing of two frequently called phone numbers. The RCL key 26 is used to recall prior entries from memory. The STO key 28 is used to store a list of phone numbers in memory, and to store entries during the programming mode. The FCN key 30 is pressed to enter a given programming mode. The CLR key 32 clears (erases from the display) the last key entry. The up and down keys 34 are used for scrolling while in any programming mode, and for volume control at all other times. Many of these control or function keys, and the alphanumeric keypad 14, may be used in the present invention.

Figure 2:
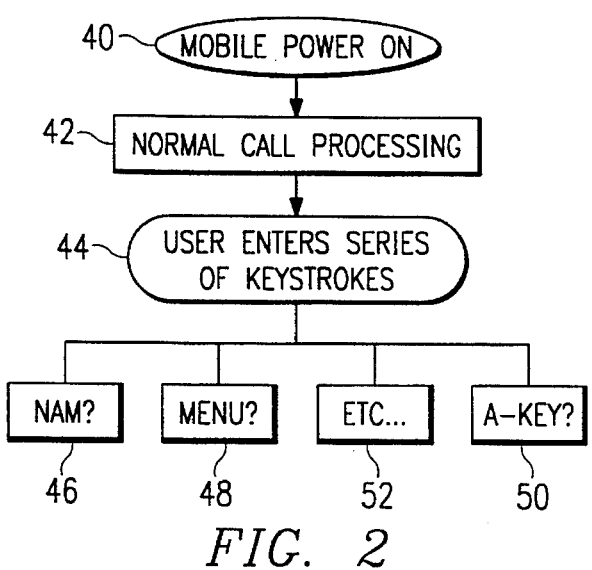
FIG. 2 is a simplified flow chart diagram which illustrates the tasks performed by a mobile station constructed in accordance with the present invention.

Referring next to FIG. 2, a simplified flow chart diagram of the tasks performed by a mobile station constructed in accordance with the present invention may now be seen. For the sake of convenience, the mobile station is first assumed to be turned off. At block 40, the user pushes the power button 12 and turns the mobile station on. At block 42, the mobile station executes the normal initialization or idle call processing procedures including the processing of messages received over the control channel, e.g., overhead and page messages. At block 44, the user enters a distinct series of keystrokes on the handset 10 to invoke any one of several processes available to the user. The user may choose to enter NAM programming mode at block 46, MENU mode at block 48, or A-key programming mode at block 50 Alternatively, the user may originate or answer a call, or invoke some other available process, at block 52.

As described heretofore, NAM programming is used to set certain basic parameters in the mobile station. NAM programming is usually completed by a skilled technician at the time of installation, and the average mobile subscriber is normally not even aware of the NAM programming capability, or the particular set of keystrokes required to enter NAM programming. Although the procedures for entering NAM programming vary among the different manufacturers (and models) of mobile stations, a typical procedure may involve the depression of a unique series of digits and then the function key. For example, to enter NAM programming with the handset 10 shown in FIG. 1, the user may press a series of digits on the keypad 16 and then push the function key 30 twice. Thereafter, the user is in NAM programming mode and he or she may scroll through a list of parameters using the up and down keys 34, and (at each stop) may enter a value for each parameter using the keypad 16. When finished, the user can push the end key 22 to exit NAM programming.

The MENU mode allows the user to select from a menu of user options and mobile phone features. For example, the user may choose to illuminate the keypad 16 from a background light, to "lock" the mobile station to prevent unauthorized use (the mobile station can then be "unlocked" by keying in a lock code), to activate a timer on the display 18 which measures the duration of each call, to switch from system A to system B (or vice versa), or to set the manner in which the user prefers to answer incoming calls (e.g., by pressing one of the digits on the keypad 16). To enter the MENU mode, the user may simply push the function key 30 twice (again, the exact procedure for entering MENU mode depends on the make and model of the mobile station; pushing the function key (once or twice), however, is a common way to enter MENU mode).

According to the present invention, the authentication key (A-key) may be entered into the mobile station not only through NAM programming (indicated at block 46 in FIG. 2), but also through a separate (and more user-friendly) A-key programming process (indicated at block 50 in FIG. 2). With the present invention, even a layman, who is not skilled in the detailed mobile phone programming methods (e.g., NAM programming), can easily program the A-key into the mobile station. The user need only know the special access code for entering A-key and the value of the A-key itself. This avoids the inconvenience of requiring mobile subscribers to have their A-keys programmed by qualified agents of the cellular system operator at perhaps remote centers. Instead, the operator, for example, may simply mail the A-key value to the mobile subscriber for convenient entry into the mobile station in the privacy of his or her home.

Figure 3:
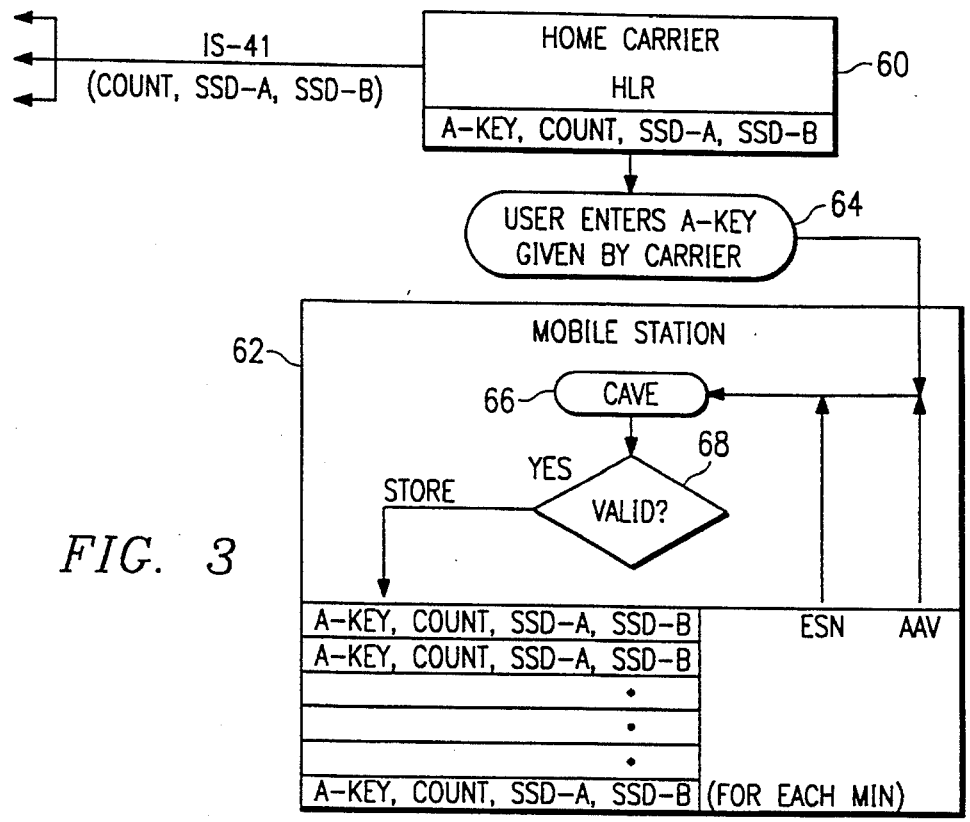
FIG. 3 is a block diagram which illustrates the separate A-key entry process of the present invention.

Referring next to FIG. 3, a block diagram which illustrates the separate A-key entry process of the present invention may now be seen. FIG. 3 shows, in block diagram form, a cellular system which includes a home location register (HLR) 60 of the local system operator (home carrier), and a mobile station 62 for a home subscriber. Each of the HLR 60 and the mobile station 62 includes a memory for storing the A-key assigned to the mobile subscriber by the home carrier, and other cryptovariables (authentication information) associated with the MIN assigned to this mobile subscriber, e.g., the shared secret data (SSD-A and SSD-B), and a call history parameter known as COUNT (according to IS-54, COUNT is a modulo-64 counter which is maintained in the mobile station and updated at the mobile station upon receipt of an update order from the base station on the AVC or DTC).

The mobile station 62 of FIG. 3 may actually store a plurality of sets of cryptovariables, one for each MIN assigned to the mobile subscriber. To avoid roamer charges when travelling away from the "home" system, a mobile subscriber may subscribe to service from several systems at once and, hence, have multiple MINs issued by different "home" carriers (multiple subscriptions). When entering the service area of any of these carriers, the mobile subscriber selects the MIN issued by the corresponding carrier to be active in the mobile station (the mobile subscriber can alternate between MINs using the function key, for example). The mobile subscriber thus becomes a home subscriber in the new system for billing and all other purposes. For these multiple MIN mobile stations, multiple A-keys (and multiple sets of the other cryptovariables) are required, one for each MIN. This is due to the restrictions imposed by IS-54 to enhance the security of the A-key, as explained below.

Each home carrier stores the A-key and other cryptovariables for each home subscriber (a given MIN/ESN combination) in its HLR for use in authenticating the mobile station (at system access, for example) and in updating the SSD. According to IS-54, the A-key is known only to the mobile station and the HLR of the home carrier, and is not passed from system to system as the mobile subscriber roams. Thus, SSD updates (in which the A-key is used to generate new SSD values) are carried out only in the mobile station and its associated HLR, and not in the serving system. As shown in FIG. 3, when the mobile station is roaming, the serving system obtains copies of cryptovariables like COUNT, SSD-A and SSD-B (but not the A-key) for the mobile station from its associated HLR via the IS-41 intersystem link.

When the user of a multiple MIN mobile station travels from an old "home" system to a new "home" system and activates the MIN for the new system, the computation of SSD updates will shift from the old home system to the new home system. However, because the new home system does not have access to the A-key used in the old home system, the new home system cannot complete an SSD update in the mobile station (the A-key is needed to generate new SSD values). To allow SSD updates in a multiple MIN mobile station, a separate A-key must be issued for each MIN/ESN combination and stored in the HLR of the corresponding home system (since other cryptovariables, e.g., SSD-A and SSD-B, are derived from the A-key, each home system must also store a separate set of cryptovariables for the corresponding MIN/ESN combination).

Returning to FIG. 3, each home carrier will issue an A-key to the mobile subscriber. The carrier may give the value of the A-key to the mobile subscriber in person, by telephone, or through the mail (according to Appendix A to IS-54, the A-key is at least 6 but not more than 26 digits long). Once the mobile subscriber receives the A-key value from the carrier, the task of entering the A-key into the mobile station at block 64 is made relatively simple by the present invention, which provides a means (separate from NAM programming) to enter the A-key using the keypad 16 and the display 18 on the handset 10 of the mobile station (refer to the following discussion of FIG. 4 for a more detailed description of the A-key entry process). Once the A-key has been entered, a verification procedure (which is specified in Appendix A to IS-54) checks the accuracy of the manually-entered digits. As shown in FIG. 3, the entered A-key digits, along with an 8-bit constant called the Authentication Algorithm Version (AAV) stored in the mobile station and the ESN of the mobile station, are used as inputs to the CAVE algorithm 66 to validate the A-key. If the entered A-key is determined to be valid at decision block 68, the entered A-key digits are stored as the A-key for the currently-active MIN.

Figure 4:
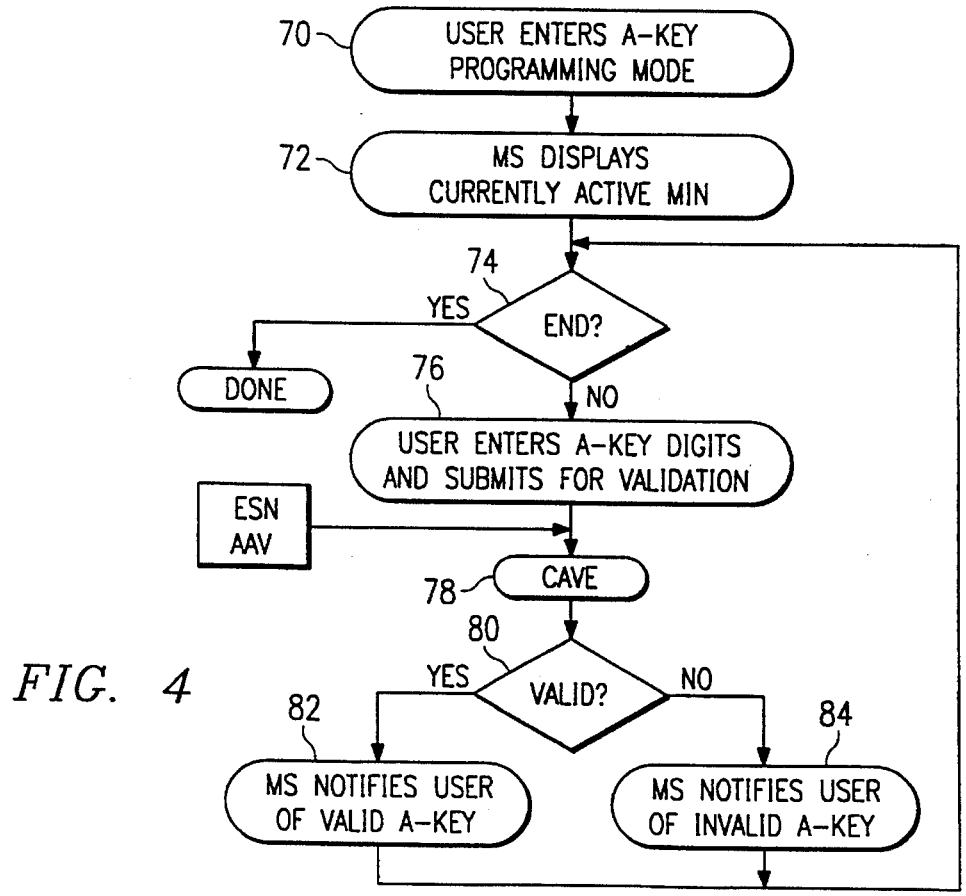
FIG. 4 is a flow chart diagram of the steps executed in a mobile station during A-key entry in accordance with the present invention.

Referring next to FIG. 4, a flow chart diagram of the steps executed in a mobile station during A-key entry in accordance with the present invention may now be seen. At block 70, the user enters the separate A-key programming mode through a short series of keystrokes (a special A-key access code) different from the series of keystrokes used to access the NAM programming mode. The exact sequence of keystrokes used to reach the separate A-key programming mode is not material to the present invention but, for practical purposes, should be made easy for the user to remember. For example, the A-key access code could be selected to correspond to the letters "A"—"K"—"E"—"Y" on the keypad 16 (the digits 2—5—3—9). The user can then simply press the sequence 2539 followed by the function key 30 (twice) to enter the A-key programming mode.

Once the user reaches the A-key programming mode, the user can proceed to enter the digits of the A-key. For multiple MIN mobile stations, a separate A-key must be entered for each MIN and, further, the A-key issued by a home carrier must be entered for the MIN assigned by this home carrier and not for another MIN in the mobile station. To make the process of entering and associating the proper A-key with the corresponding MIN easier, the mobile station (MS) at block 72 displays an indication of the currently-active MIN (the MIN for the system in which the mobile station is currently operating), before the user begins to enter the digits of the first A-key. It is not necessary, however, for the MS to display the currently-active MIN instead of some other MIN in the MS since the user can scroll between the different MINs by pressing the up and down keys 34. The steps executed in the MS will be the same regardless of which A-key is being entered.

Assuming that the currently-active MIN is the first MIN to be displayed upon entering the A-key programming mode, the display 18 may show, for example, all 10 digits of the currently-active MIN, or some other alphanumeric designation for this MIN (e.g., "1" or "A" or "MIN1" or "A-key? 1" for the first MIN, "2" or "B" or "MIN2" or "A-key? 2" for the second MIN, etc.), or a combination of both. At decision block 74, the MS determines whether the user has pressed the end key 22 to exit from the A-key programming mode. If the end key 22 is pressed, the MS will return to processing other tasks. Otherwise, the MS remains in the A-key programming mode, ready to accept entry of the A-key digits (the MS, however, may exit from the A-key programming mode if a predetermined amount of time elapses without any user activity).

At block 76, the user enters on the keypad 16 the six to twenty six digits of the A-key for the MIN indicated on the display 18 (the currently-active MIN, or another MIN to which the user has scrolled). When the user starts to enter the A-key digits, a part or all of the MIN indication may disappear from the display 18 to make room for displaying the A-key digits, which are displayed as they are being entered. If the user makes a mistake, he or she may clear all or part of the entered number by using the clear button 32. After the entire digit sequence has been keyed in, the user will press the store button 28 (twice) to store the complete number. At this point, the MS will validate the entered A-key through the CAVE algorithm.

At block 78, the CAVE algorithm is initialized with the entered A-key digits, ESN, and AAV, and then executed in the manner specified by Appendix A to IS-54. At decision block 80, the MS determines whether the A-key entered by the user is valid. If the entered A-key number is valid, the display 18 at block 82 will provide an indication of validity to the user (e.g., the word "valid" or "OK" on the display 18, or an audible positive tone out of the speaker 14), and the MS will associate the number with the corresponding MIN in memory (if an old A-key exists in memory, the new A-key will overwrite the old A-key). Conversely, if the entered A-key number is invalid, the display 18 at block 84 will provide an indication of invalidity to the user (e.g., the word "invalid" or the words "try again," or an audible negative tone). In either case, the user can press the end key 22 to exit the A-key programming mode, attempt to reenter the A-key correctly, or scroll to another MIN for entry of the corresponding A-key.

The foregoing detailed description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. A mobile station comprising:

a plurality of data entry keys;

means for operating said mobile station in a plurality of programming modes including an authentication key programming mode and a number administration module (NAM) programming mode;

means for enabling the selection of one of said programming modes through said data entry keys;

a memory containing at least one mobile identification number (MIN);

means for receiving an authentication key (A-key) entered by the user while said authentication key programming mode is selected; and means for storing the entered A-key with said at least one MIN in said memory.

2. The mobile station of claim 1 wherein said authentication key programming mode is selected through a unique series of keystrokes.

3. The mobile station of claim 1 wherein said mobile station stores in said memory a plurality of mobile identification numbers (MINs), and wherein:

said receiving means comprises means for prompting the user to enter an authentication key (A-key) for each of said MINs; and said storing means comprises means for storing the entered A-key with the corresponding MIN in said memory.

4. The mobile station of claim 3 further comprising means for validating the entered A-key prior to being stored with the corresponding MIN in said memory.

5. The mobile station of claim 4 further comprising means for generating an audible or visual indication of whether the entered A-key is valid.

6. A method for entering authentication information into a mobile station which is assigned at least one mobile identification number (MIN), said at least one MIN being stored in said mobile station, comprising the steps of:

assigning a separate authentication key (A-key) for each of said at least one MIN stored in said mobile station;

displaying in said mobile station an indication of any stored MIN in response to a user-entered command;

receiving in said mobile station a value of the A-key entered by the user for storing with the indicated MIN;

validating the received value of the A-key through an authentication algorithm executed in said mobile station;

storing in said mobile station the received A-key value with the indicated MIN if the received A-key value is determined to be valid; and arranging said mobile station to receive new value of the A-key, to be entered by the user for storing with the indicated MIN or another MIN, if the received A-key value is determined to be invalid.

7. The method of claim 6 wherein said mobile station operates in at least two modes, including a set-up programming mode and an A-key programming mode, and wherein said user-entered command invokes said A-key programming mode.

8. The method of claim 6 further comprising the step of displaying an indication of the validity of the received A-key value as determined from the execution of said authentication algorithm.

9. The method of claim 6 wherein said mobile station stores the MIN corresponding to the system in which said mobile station is operating, and at least one other MIN corresponding to a different system, and wherein said displaying step comprises the steps of:

displaying an indication of the MIN corresponding to the system in which said mobile station is operating; and displaying an indication of another MIN in response to a user-entered command, said indication of another MIN replacing said indication of the operating MIN.

10. The method of claim 6 wherein said MIN indication comprises the value of the MIN.

11. A system for entering authentication information into a mobile station which is assigned at least one mobile identification number (MIN), said at least one MIN being stored in said mobile station, comprising:

means for assigning a separate authentication key (A-key) for each of said at least one MIN;

means for displaying in said mobile station an indication of any one of said at least one MIN in response to a user-entered command;

means for receiving in said mobile station a value of the A-key entered by the user for storing with the indicated MIN;

means for validating the received value of the A-key through an authentication algorithm executed in said mobile station;

means for storing in said mobile station the received A-key value with the indicated MIN if the received A-key value is determined to be valid; and means for receiving in said mobile station a new value of the A-key, entered by the user for storing with the indicated MIN or another MIN, if the received A-key value is determined to be invalid.

12. The system of claim 11 wherein said mobile station operates in at least two modes, including a set-up programming mode and an A-key programming mode, and wherein said user-entered command invokes said A-key programming mode.

13. The system of claim 11 further comprising means for displaying an indication of the validity of the received A-key value as determined from the execution of said authentication algorithm.

14. The system of claim 11 wherein said mobile station stores the MIN corresponding to the system in which said mobile station is operating, and at least one other MIN corresponding to a different system, and wherein said means for displaying comprises:

means for displaying an indication of the MIN corresponding to the system in which said mobile station is operating; and means for displaying an indication of another MIN in response to a user-entered command, said indication of another MIN replacing said indication of the operating MIN.

15. The system of claim 11 wherein said MIN indication comprises the value of the MIN.

* * * * *